United States Patent [19]

Chittenden et al.

[11] 4,156,190

[45] May 22, 1979

[54] ELECTRONIC BICYCLE ODOMETER AND SPEEDOMETER

[76] Inventors: Bruce C. Chittenden, 11440 8th St. E., Treasure Island, Fla. 33706; Robert E. Hay, 10080 11th St. N. #108, St. Petersburg, Fla. 33702

[21] Appl. No.: 804,910

[22] Filed: Jun. 9, 1977

[51] Int. Cl.² .............................................. G01P 3/36
[52] U.S. Cl. .................................... 324/175; 324/168; 73/490; 250/571; 235/92 V
[58] Field of Search ............... 324/175, 163, 166, 168, 324/173, 174, 178, 179; 73/231 R, 490; 74/501 R; 250/231 R, 571; 235/92 V, 98 C

[56] References Cited

U.S. PATENT DOCUMENTS

| 2,523,297 | 9/1950 | Hastings | 324/168 X |
|---|---|---|---|
| 3,135,116 | 6/1964 | Kwong et al. | 73/231 R |
| 3,622,801 | 11/1971 | Stone | 324/175 X |
| 3,652,864 | 3/1972 | Person | 250/571 |
| 3,675,199 | 7/1972 | Jamison et al. | 73/490 X |
| 3,814,934 | 6/1974 | Mesh et al. | 324/175 X |
| 3,821,896 | 7/1974 | Grob | 324/175 X |
| 3,846,701 | 11/1974 | Sampey | 324/175 |
| 3,866,120 | 2/1975 | Ford | 324/175 |
| 3,898,563 | 8/1975 | Erisman | 324/166 |
| 4,007,419 | 2/1977 | Jasmine | 324/166 |

FOREIGN PATENT DOCUMENTS 2532033 3/1977 Fed. Rep. of Germany .......... 324/166

OTHER PUBLICATIONS

Mereness, Bicycle Tachometer/Speedometer, IBM Tech. Disc. Bulletin, Feb. 1975, pp. 2570 & 2571.

*Primary Examiner*—Stanley T. Krawczewicz
*Attorney, Agent, or Firm*—Cahill, Sutton & Thomas

[57] ABSTRACT

An electronic odometer and speedometer for bicycles computes distance and speed based upon input signals generated by interruption of a light beam by each spoke and the valve stem of a wheel of the bicycle. The interruption time of the light beam caused by the valve stem is substantially greater than that caused by the spokes; accordingly, it is readily detectable and the signal produced may be treated as a reference signal upon which the computations are based and the signals generated by the spokes provide a continuous real time update. Alternatively, the number of interruptions of the light beam per time, may be employed to compute the speed and the aggregate period of the number of interruptions may be employed to compute the distance. The light signal generating and detaching elements have non-movable parts and are mounted upon the frame of the bicycle without interfering with the normal removal and mounting of the wheel. An electronic readout is conveniently mounted for viewing by the cyclist and may include selectively lightable solid numerics.

5 Claims, 7 Drawing Figures

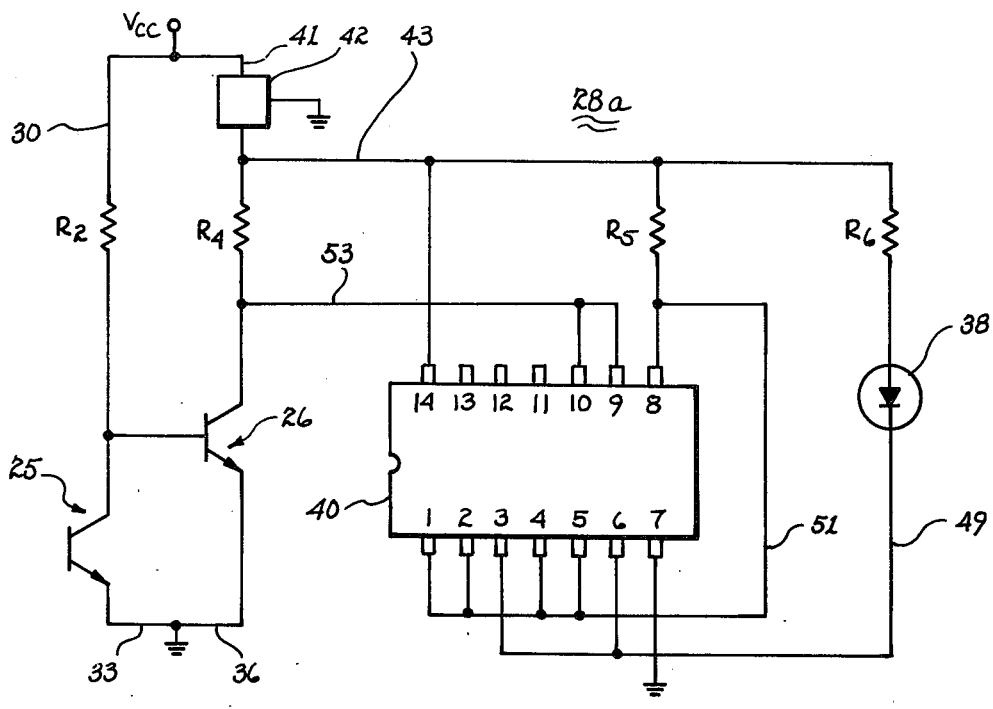
fig. 5
fig. 5a
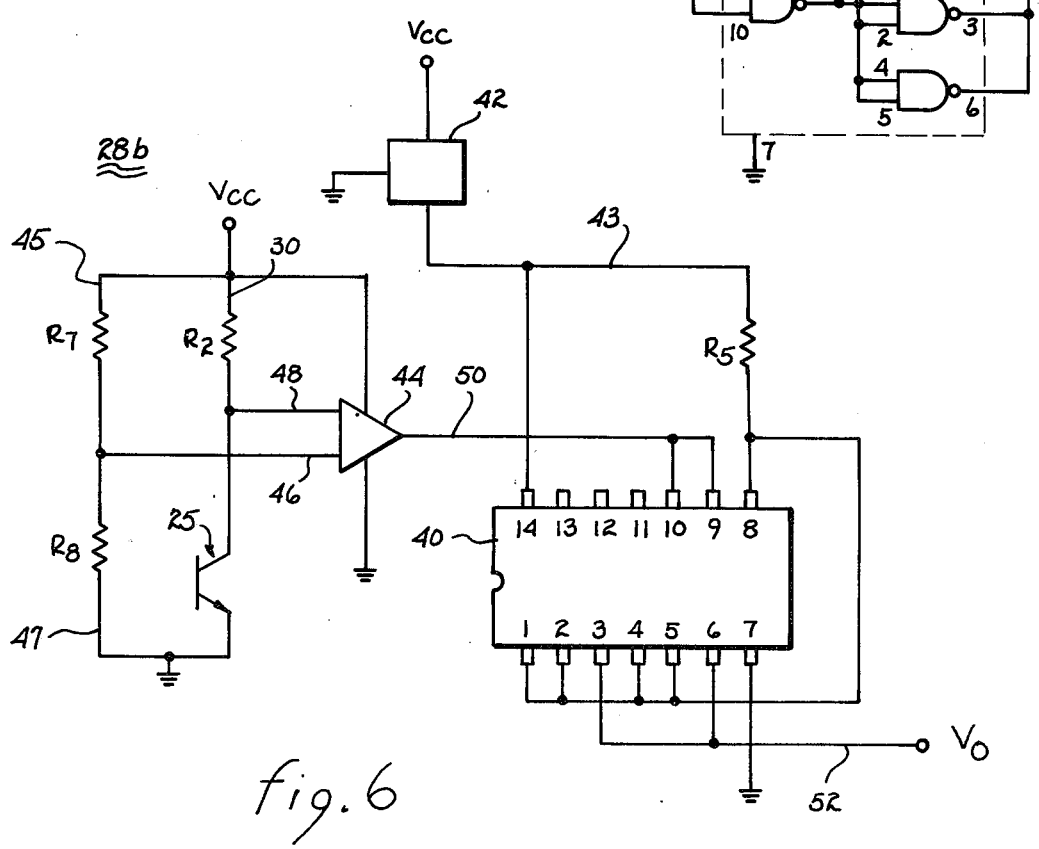
fig. 6

ELECTRONIC BICYCLE ODOMETER AND SPEEDOMETER

The present invention relates to distance and speed measuring equipment and, more particularly, to odometers and speedometers for vehicles having spoked wheels.

Ever since bicycles first became available to the general public, various devices have been created to measure either or both distance traveled and speed. Initially, they were mechanical devices gear driven by either the front or rear wheel or they were operated by one or more prongs attached to the spokes of one of the wheels. While they were reasonably satisfactory, they required a certain degree of maintenance which the cyclists were seldom willing to provide; further, because they were operated by one of the wheels of the bicycle, they created unnecessary drag. U.S. Pat. No. 3,938,395 is representative of these types of devices.

Various electro-mechanical devices have also been developed. U.S. Pat. No. 3,784,913 is representative of this group wherein an electrical generator is mechanically coupled to the prime mover or wheel of a vehicle such that rotation of the armature of the generator is commensurate or proportional with the speed of the vehicle. The output signal generated is acted upon by circuitry to provide the desired speed and distance information.

To eliminate mechanical interconnection between odometers and speedometers, devices have been developed which provide an input signal from variable reluctance pickup means or the passage of a magnet past a magnetically sensitive switch, as illustrated in U.S. Pat. No. 3,826,985 and in an article entitled "Build a Digital Bicycle Speedometer" appearing in the March, 1977, issue of *Popular Electronics* on page 39, respectively. A number of devices have also been developed which rely solely upon the interruption of a light beam to produce detectable signals. U.S. Pat. Nos. 3,491,247, 3,652,864, 3,735,260, 3,814,934 and 3,846,901 are representative of devices of this type. Generally, these devices are pulse counting devices and require masks of particular dimensions or particular orientations of two or more light emitting elements.

It is therefore a primary object of the present invention to provide a device for sensing the rotation of a bicycle wheel without imposing drag upon the wheel.

Another object of the present invention is to provide a speed and/or distance measuring device for bicycles which is useable with any spoked wheel.

Yet another object of the present invention is to provide a wheel rotation sensing mechanism for bicycles which does not interfere with normal mounting and dismounting of the bicycle wheels.

Still another object of the present invention is to provide a wheel rotation sensor for bicycles which is noiseless.

A further object of the present invention is to provide circuitry for generating signals by interruption of a light beam by the spokes and valve stem of a bicycle wheel.

A yet further object of the present invention is to provide sensor circuitry for generating signals useable by computation circuitry to calculate speed and distance.

A still further object of the present invention is to provide a self-contained battery operated odometer and speedometer useable with any vehicle.

These and other objects of the present invention will become apparent to those skilled in the art as the description thereof proceeds.

The present invention may be understood with greater specificity and clarity with reference to the following drawings, in which:

FIGS. 5 and 5a are schematics of a variant of the sensor circuit;

FIG. 6 is a schematic of a further variant of the sensor circuitry.

Figure 1:
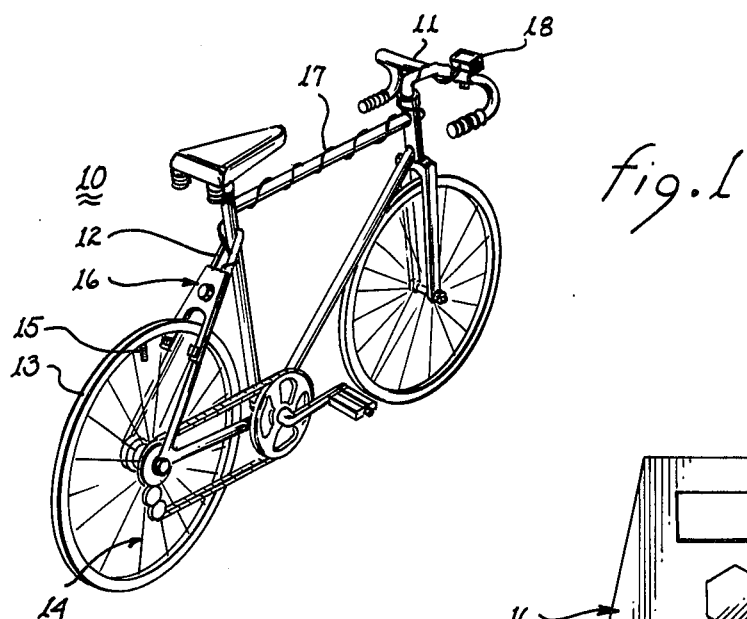
FIG. 1 is a perspective view of a bicycle having the present invention mounted thereon.

Referring to FIG. 1, there is shown a typical bicycle 10 having a handle bar 11 and a rear fork 12 supporting, in part, a rear wheel 13. The rear wheel, as is conventional, includes a plurality of supporting spokes 14 and a valve stem 15. A velocity sensor module 16 is mounted upon rear fork 12 and generates signals commensurate with the rate and duration of rotation of rear wheel 13 which signals are acted upon by a computation circuit for determining speed and/or distance. These signals are transmitted through wire 17 to a visual display 18 on handle bar 11, as illustrated. The visual display provides an indication of speed and/or distance traveled. Typically, the display may include solid state numerics selectively energizable by the cyclist.

Figure 2:
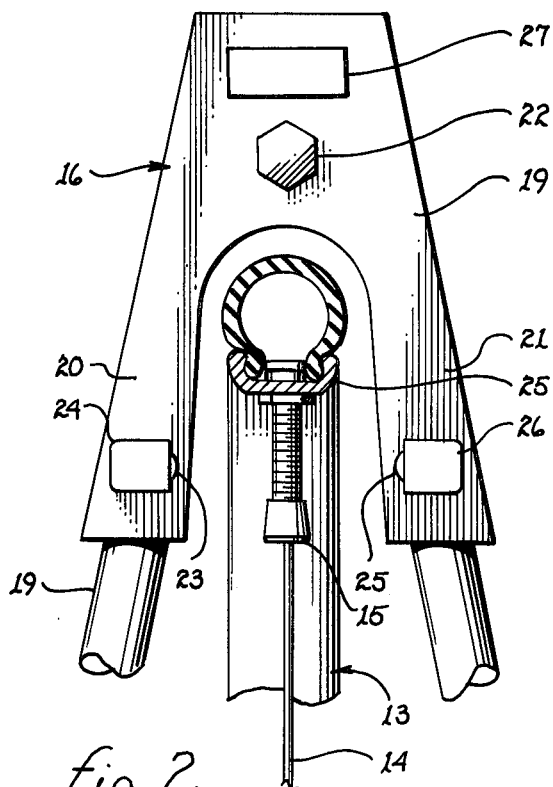
FIG. 2 illustrates the relationship between the input signal generating apparatus and the bicycle wheel.

Turning now to FIG. 2, velocity sensor module 16 will be described in further detail. A plate 19, having a pair of legs 20 and 21 extending downwardly along opposed sides of wheel 13 is mounted upon rear fork 12 by nut and bolt means 22. A light emitting diode (LED) 23 is mounted within bracket 24 upon leg 20 at a point below rim 25 of wheel 13 and transverse to valve stem 15 when the latter travels therepast. Photo transistor 25 is mounted within bracket 26 upon leg 21 in alignment with the light beam emitted from LED 23. By this arrangement, the light beam emanating from LED 23 and sensed by photo transistor 25 will be interrupted by each spoke 14 of the wheel and by the valve stem each time they pass through the light beam. To maximize the light intensity striking the photo transistor, the LED and the photo transistor should be carefully aligned. Additionally, the vertical position as well as the lateral spacing therebetween may have to be adjusted to assure that a sufficient magnitude of light energy is received by the photo transistor from the LED.

The signals generated by photo transistor 25 as a result of repetitive interruptions of the light beam from LED 23 are transmitted to computation circuit 27, which circuit may be mounted upon plate 16, as illustrated. Alternatively, the computation circuit may be mounted within visual display 18. In the latter case, wire 17 would transmit the signals generated by phototransistor 25 directly to a visual display wherein the computation and display functions would be generated.

Figure 3:
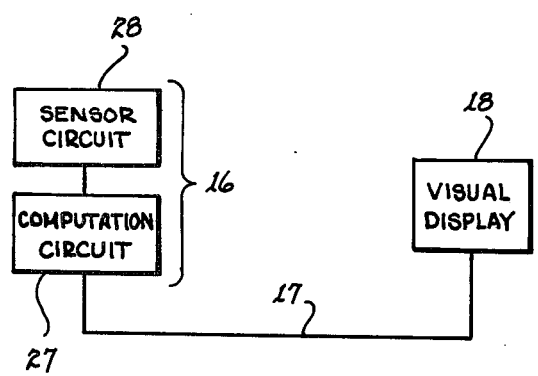
FIG. 3 is a block diagram of the major component of the present invention.

FIG. 3 illustrates, in block diagram format, the circuit of the present invention. The sensor circuit, including LED 23 and phototransistor 25 is identified by block 28 and may be directly coupled with computation circuit 27. Wire 17 conveys the output signals from the computation circuit to visual display 18, whereas solid state numerics may be continuously or selectively energized to provide speed and distance information to the cyclist.

Figure 4:
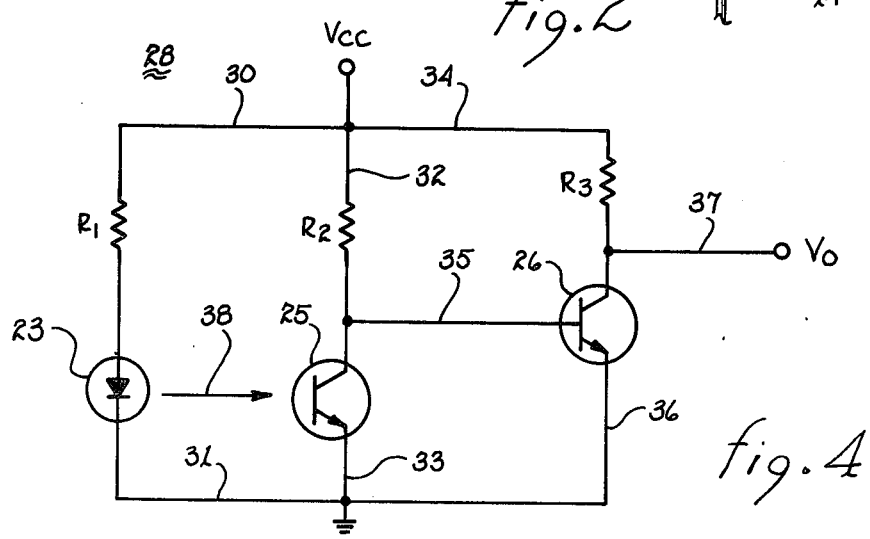
FIG. 4 is a basic schematic of the sensor circuit.

Referring to FIG. 4, there is shown a representative circuit useable as sensor circuit 28, which circuit may be wholly mounted upon plate 19. A supply voltage $V_{cc}$ is provided by a battery which is typically rated with a 9 volt output. A current limiting resistor $R_1$ is connected to supply voltage $V_{cc}$ by electrical conductor 30 and to the anode electrode of LED 23. The cathode electrode of LED 23 is coupled to a reference voltage, typically ground, by electrical conductor 31. It has been found that a value of 75 ohms for resistor $R_1$ produces a sufficient light output from LED 23 to insure detection by photo transistor 25. A collector load resistor $R_2$ is coupled to supply voltage $V_{cc}$ by electrical conductor 32 and to the collector anode of photo transistor 25. Typically, resistor $R_2$ may have a value of 100,000 ohms. The emitter electrode of the photo transistor is coupled to a reference voltage, such as ground, by electrical conductor 33. Resistor $R_3$ is connected to supply voltage $V_{cc}$ through electrical conductor 34 and to the collector anode of a switching transistor 26. The base of the switching transistor is connected to the collector electrode of photo transistor 25 through electrical conductor 35. The emitter electrode of switching transistor 26 is connected to a reference voltage, such as ground, through an electrical conductor 36. The output voltage $V_O$ from sensor circuit 28 is derived from the collector electrode of the switching transistor through electrical conductor 37.

The operation of sensor circuit 28 will now be described. The sensor circuit is energized by a current flow through electrical conductor 30 and resistor $R_1$ to the anode electrode of LED 23, which causes the LED to emit light energy, as indicated by arrow 38. The light energy emitted from LED 23 and detected by photo transistor 25 and cause the photo transistor to conduct and draw current through electrical conductor 32 and resistor $R_2$. The flow of current through resistor $R_2$ causes the voltage at electrical conductor 35 to drop to a near zero level. The near zero voltage level at the base electrode of switching transistor 26 turns off the switching transistor and precludes a current flow through collector load resistor $R_3$ resulting in a voltage at electrical conductor 37 of a value approximately equal to that of the supply voltage $V_{cc}$. Thus, when photo transistor 25 receives light energy from LED 23, the output voltage $V_O$ of sensor circuit 28 will be at a voltage level approximately equal to that of the supply voltage.

When light beam 38 between LED 23 and photo transistor 25 is interrupted by the passage of a spoke 14 or valve stem 15, the photo transistor will cease to conduct current and the voltage at electrical conductor 35 will rise to a voltage approximately equal to that of the supply voltage $V_{cc}$ since there is no appreciable voltage drop across resistor $R_2$. The increased voltage on electrical conductor 35 connected to the base electrode of switching transistor 26 will forward bias the switching transistor and current will flow through electrical conductors 34 and 36. The resulting voltage drop across collector load resistor $R_3$ will reduce the output voltage $V_O$ at electrical conductor 37 to a value substantially below that of the supply voltage $V_{cc}$. When photo transistor 25 again receives light energy from LED 23 with passage of the spoke or valve stem therepast, the photo transistor will again conduct current and switching transistor will be switched off, as described above, and the output voltage $V_O$ will rise to a level near that of the supply voltage $V_{cc}$.

In summary, each revolution of wheel 13 causes a plurality of spokes and the valve stem to interrupt the transmission of light between LED 23 and photo transistor 25. The multiple interruptions will generate a plurality of voltage level changes (or digital outputs) of output voltage $V_O$, which changes are directly proportional to the speed of the bicycle. By utilizing a straightforward counter design of a type well known to those skilled in the computation circuitry art, the digital output signals ($V_O$) can be readily coupled to a seven segment digital output display (visual display 18) to digitally indicate the speed of the bicycle in any preferred units and the distance travelled.

Since bicycles are typically fabricated with 20", 24", 26" or 27" diameter wheels, and as the number of spokes of a particular wheel may vary from between 30 and 37 in number, it will be necessary to adapt the computation circuit to be properly calibrated for a particular bicycle upon which the present invention is to be installed.

As a matter of interest, LED 23, photo transistor 25 and switching transistor 26 may be of the type manufactured by Motorola and identified as M900, MRD450 and MPSA20, respectively.

FIG. 5 illustrates a sensor circuit 28a which is a variant of the sensor circuit illustrated in FIG. 4. Sensor circuit 28a generates a digital output signal by selectively illuminating light emitting diode (LED) 38. For purposes of clarity, the elements common to both circuits will be identified by the same numerals. The purpose of sensor circuit 28a is that of providing a more sharply defined output pulse and substantially greater light output from LED 38 than would be possible were the LED to be driven directly by switching transistor 26. This purpose is accomplished by inserting an integrated circuit (IC) 40 between the collector of switching transistor 26 and LED 38. IC 40 is a multiple NAND gate manufactured by Texas Instruments and identified as type 7401.

The internal structure of IC 40, a commercially available off-the-shelf unit, is illustrated in FIG. 5a. A voltage regulator 42 interconnects supply voltage $V_{cc}$ with power supply pin 14 of IC 40 through electrical conductors 41 and 42 and provides the requisite five volt input potential for the IC. A 400 ohm collector load resistor $R_4$ is connected intermediate electrical conductor 43 and the collector electrode of switching transistor 26. And, the collector electrode of the switching transistor is connected to pins 9 and 10 by electrical conductor 53. A 5,000 ohm resistor $R_5$ interconnects pin 8 of IC 40 with voltage regulator 42 through electrical conductor 43. Pin 8 is electrically connected to pins 1, 2, 4 and 5 of IC 40 through electrical conductor 51. Pin 7 of the IC is grounded. 160 ohm resistor $R_6$ series connects the anode electrode of LED 38 with electrical conductor 43 and controls the intensity of illumination of the LED. The cathode electrode of the LED is electrically connected to pins 3 and 6 of IC 40 by electrical conductor 49.

A further variant sensor circuit 28b is illustrated in FIG. 6. Herein, a voltage comparator 44, commercially identified an an LM399, has replaced switching transistor 26 to provide an increased sensitivity of the sensor circuit to changes in intensity of the light beam emanating from LED 23 and striking photo transistor 25. A first biasing resistor $R_7$ is connected to supply voltage $V_{cc}$ through electrical conductor 45 and to the first input lead 46 of voltage comparator 44. A second biasing resistor $R_8$ interconnects the first input lead with a reference voltage, such as ground, through an electrical conductor 47. The second input lead 48 to the comparator is electrically connected to the collector electrode of photo transistor 25. Typically, the value of resistor $R_7$ is 100,000 ohms and the value of $R_8$ is 5,000 ohms. These values are adjusted such that the voltage at first input 46 of voltage comparator 44 is as nearly equal as possible to the voltage present at the second input lead 48 of the comparator when photo transistor 25 conducts in response to light from LED 23. Thereby, whenever there is a small change in the intensity of the light energy striking the photo transistor, the voltage level on second input lead 48 will shift correspondingly. The resulting differential voltage input between the first and second input leads of comparator 44 will result in a relatively large output voltage swing on electrical conductor 50 of the comparator. Electrical conductor 50 is connected to pins 9 and 10 of IC 40. The output voltage present on output conductor 50 of comparator 44 will trigger IC 40 to generate a digital output pulse $V_O$ on electrical conductor 52, connected to pins 3 and 6 of the IC. The output pulse present on electrical conductor 52 may be used to illuminate and LED in the manner disclosed in FIG. 5 or it may be used to directly drive computation circuit 27 (see FIG. 3).

In some installations, it may be necessary or expedient to utilize an LED 23 which generates light energy in the infrared spectrum. In such an installation, it would be possible to filter the output of LED 23 and the input to phototransistor 25 to eliminate all light energy lying outside the infrared spectrum. Such filtering would preclude spurious signals from strong ambient light or from reflections from other light sources.

Computation circuit 27, referenced to the number interruptions of the light beam striking photo transistor 25 in the aggregate and/or per time period, can compute both the speed and distance travelled. The output from the computation circuit is conveyed to visual display 18 which displays a numerical indication of the speed and/or distance travelled.

The sensor circuit, such as variant 28b is sufficiently sensitive to discriminate between the different output pulse ($V_O$) widths produced by the spokes and by the valve stem. With such discrimination, the computation circuit can be adapted to reference its computations to the light beam interruptions by the valve stem; or, stated another way each revolution of the wheel is readily determinable. The computations performed can then be referenced to revolutions of the wheel.

While the principles of the invention have now been made clear in an illustrative embodiment, there will be immediately obvious to those skilled in the art many modifications of structure, arrangement, proportions, elements, materials, and components used in the practice of the invention which are particularly adapted for specific environments and operating requirements without departing from those principles.

We claim:

1. Apparatus for use in conjunction with a rotatable element having a plurality of equiangularly spaced first members for interrupting for a first time interval a light beam directed transverse to the rotating element and at least one second member for interrupting for a second time interval the light beam, the second time interval being distinct from the first time interval, to determine the rate of rotation and number of revolutions of the element, said apparatus comprising (a) a light emitting diode mountable in proximity to one side of the element for emitting the light beam interruptable by the first and second members;
   (b) a photo transistor mountable is proximity to the other side of the element for sensing the light beam emitted by said light emitting diode and interrupted by the first and second members, said photo transistor having a first state of conduction during receipt of light from said light emitting diode and a second state of conduction during interruption of the emitted light beam by the first and second members;
   (c) a switching transistor responsive to the first and second states of conduction of said photo transistor for developing a first output signal reflective of the interruption of the emitted light beam by the first members during the first time interval and a second output signal reflective of the interruption emitted light beam by the second member during the second time interval;
   (d) computation circuitry responsive to said first output signals for computing the rotation rate of the element and responsive to said second output signals for computing the number of revolutions of the element; and
   (e) means for depicting a first indication relative to the rate of rotation of the element and a second indication relative to the number of revolutions of the element.

2. Apparatus for use in conjunction with a spoked wheel having a plurality of spokes extending radially inwardly from the rim of the wheel and a valve stem extending radially inwardly from the rim to determine the rate of revolution and number of revolutions of the wheel, said apparatus comprising in combination:

(a) a light emitting diode mountable in proximity to the rim on one side of the wheel for emitting a light beam interruptable by the spokes and the valve stem;
   (b) a photo transistor mountable in proximity to the rim on the other side of the wheel for sensing the light emitted by said light emitting diode and interrupted by the spokes and valve stem, said photo transistor having a first state of conduction during receipt of light from said light emitting diode and a second state of conduction during interruption of the emitted light beam by the spokes and valve stem;
   (c) a switching transistor responsive to the first and second states of conduction of said photo transistor of developing a first output signal reflective of the interruption of the emitted light beam by the spokes and a second output signal reflective of the interruption of the emitted light beam by the valve stem;
   (d) computation circuitry responsive to said first output signals for computing the rotation rate of the wheel and responsive to said second output signals for computing the number of revolutions of the wheel; and
   (c) a visual display responsive to said computation circuitry for depicting a first indication relative to the rate of rotation of the wheel and a second indication relative to the number of revolutions of the wheel.

3. The apparatus as set forth in claim 2 including a two-legged plate mountable upon a bicycle for bracketing one of the wheels of the bicycle, said plate including a first leg for supporting said light emitting diode and a second leg for supporting said photo transistor.

4. The apparatus as set forth in claim 3 wherein said visual display includes a speedometer and an odometer.

5. The apparatus as set forth in claim 4 wherein said computation circuitry is mounted upon said plate.

* * * * *